(12) United States Patent
Mehnert et al.

(10) Patent No.: US 9,200,925 B2
(45) Date of Patent: *Dec. 1, 2015

(54) ABSOLUTE HIGH RESOLUTION SEGMENT OR REVOLUTION COUNTER

(71) Applicants: Walter Mehnert, Ottobrunn (DE); Thomas Theil, Weichs (DE)

(72) Inventors: Walter Mehnert, Ottobrunn (DE); Thomas Theil, Weichs (DE)

(*) Notice: Subject to any disclaimer, the term of this patent is extended or adjusted under 35 U.S.C. 154(b) by 0 days.

This patent is subject to a terminal disclaimer.

(21) Appl. No.: 14/073,096

(22) Filed: Nov. 6, 2013

(65) Prior Publication Data

US 2014/0067301 A1    Mar. 6, 2014

Related U.S. Application Data

(63) Continuation of application No. 12/672,897, filed as application No. PCT/DE2008/001306 on Aug. 7, 2008, now Pat. No. 8,655,615.

(30) Foreign Application Priority Data

Aug. 17, 2007   (DE) .................. 10 2007 039 051

(51) Int. Cl.
  *G01R 1/16*   (2006.01)
  *G01D 5/245*   (2006.01)
  *G01D 5/14*   (2006.01)
  *G01P 3/481*   (2006.01)
  *G01P 13/04*   (2006.01)

(52) U.S. Cl.
  CPC .............. *G01D 5/2454* (2013.01); *G01D 5/145* (2013.01); *G01D 5/2455* (2013.01); *G01P 3/4815* (2013.01); *G01P 13/04* (2013.01)

(58) Field of Classification Search
  USPC ............. 702/77, 80, 90–92, 94, 150, 151, 78; 324/207.15, 207.23, 249; 73/861.75
  See application file for complete search history.

(56) References Cited

U.S. PATENT DOCUMENTS

| 4,364,013 A | 12/1982 | Castera et al. |
| 5,128,614 A | 7/1992 | Schewe |
| 5,148,106 A | 9/1992 | Ozawa |

(Continued)

FOREIGN PATENT DOCUMENTS

| DE | 2817169 C2 | 10/1979 |
| DE | 4107847 C1 | 9/1992 |

(Continued)

OTHER PUBLICATIONS

The State Intellectual Property Office of P.R. China, First Notification of Office Action (PCT Application Entry Into the National Phase) Issued on Jun. 9, 2011, Application No. 200880103160.1, Absolute High Resolution Segment or Revolution Counter, Applicant: Mehnert & Theil, pp. 1-5.

(Continued)

*Primary Examiner* — Mohamed Charioui
(74) *Attorney, Agent, or Firm* — Woodling, Krost and Rust (57) ABSTRACT

An absolute high resolution linear segment or revolution counter as a one-chip-solution with self sustained, economical intermediate solutions, preferably as absolute magnetic multi turn, having a Wiegand element for counting the revolutions or segments, respectively and for the energy supply of the counter and memory as well as processing electronics, whereby the additional sensor for the fine resolution and a µ-controller are part of the overall IC is disclosed.

18 Claims, 9 Drawing Sheets

(56) References Cited

U.S. PATENT DOCUMENTS

| | | | |
|---|---|---|---|
| 5,663,641 A | | 9/1997 | Morita |
| 2006/0164077 A1* | | 7/2006 | Mehnert et al. .......... 324/207.23 |

FOREIGN PATENT DOCUMENTS

| | | |
|---|---|---|
| DE | 10259223 B3 | 2/2004 |
| DE | 19722016 A1 | 12/2009 |
| EP | 1607720 A2 | 6/2005 |
| FR | 2861459 A1 | 4/2005 |
| WO | 2004046735 A1 | 6/2004 |

OTHER PUBLICATIONS

The State Intellectual Property Office of P.R. China, Second Notification of Office Action Issued Apr. 12, 2012, Application No. 200880103160.1, Absolute High Resolution Segment or Revolution Counter, Applicant: Mehnert & Theil, pp. 1-5.

The State Intellectual Property Office of P.R. China, Third Notification of Office Action Issued Oct. 19, 2012, Application No. 200880103160.1, Absolute High Resolution Segment or Revolution Counter, Applicant: Mehnert & Theil, pp. 1-5.

International Search Report, International Application No. PCT/DE2008/001306, WO 2009/024120 A3, Sep. 4, 2009.

* cited by examiner

ABSOLUTE HIGH RESOLUTION SEGMENT OR REVOLUTION COUNTER

The invention relates to an absolute high resolution segment or revolution counter which counts in both directions and comprises at least one moving excitation magnet.

An absolute linear segment or revolution counter retrieves its count information which it is storing permanently, without the aid of external electrical energy. It generates the electrical energy required for counting and storing from the kinetic energy of the drive, and this under all conditions, i.e. also at speeds approaching zero. The number of the revolutions to be detected and stored, is, therein, unlimited in respect to physics. It carries out its high resolution function in an absolute way, i.e. its current position is available to it undelayed after interruption of the power and switching it on again.

High resolution counters within up to one revolution are noted, in the general language usage, as single turn. the combination of high resolution up to one revolution with counting of several revolutions as multi turn. Therefore, the present case relates to a multi turn.

Magnetic elements for the detection of translational and/or rotational movements are known as so called pulse wire movements detectors as disclosed in U.S. Pat. No. 4,364,013 or as Wiegand sensors as disclosed in the DE 4 1007 847 C1 or the DE 2 817 169 C2, in which a pretreated wire out of a ferromagnetic material is wrapped by a sensor coil. The magnetic zones which are at the beginning randomly orientated in the ferromagnetic material—called magnetic domains or also Weiß zones—orient themselves in one single domain under the influence of external mechanical and/or magnetic forces. Upon application of an external magnetic field of a certain direction and size, this domain "abruptly flaps over" which results in a voltage pulse which may be taken off as an output signal.

In ferromagnetic materials, the interaction of the magnetic moments of adjacent atoms having different magnetization directions, is very strong which leads to an alignment of the moments in small areas of space. The above-mentioned, magnetic domains, Weiß zones or areas are separated from each other by transition layers called Bloch walls. By the influence of external forces, it is possible—as stated above—to achieve the above-mentioned, single domain, ferromagnetic element. If such a domain is brought to into an external magnetic field of a certain size and direction, the elementary magnets out of a starting position—preferably an end of the wire—flap like dominos into the direction of the external field which leads to a wave of flapping events having a finite velocity in the ferromagnetic element, which is, however, large as compared to the velocity of the exciting magnet, so that one can speak of an "instantaneous napping over" of the this domain.

The above-mentioned effect of the Bloch wall running across the ferromagnetic element, is used according to DE 102 59 223, for evaluating the polarity and the position of the excitation magnet in that, by means of an additional sensor element, the deployment direction of the magnetization reversal of the ferromagnetic element to be initiated from both front sides, i.e. the direction of the magnetization reversal of the ferromagnetic element, is determined.

In the general case which is characterized by an excitation magnet and the resolution of one half of a revolution, the revolution counter system is completely described by the four known excitation magnet states in connection with its position last stored.

By means of this measure, however, a position detector having a conceivably simple mechanical construction may be realized which is operable without failure also at speeds approaching zero and upon the failure of the regular energy supply with only ferromagnetic element in both movement directions of the excitation magnets, wherein it has to be noted that the information about the deployment direction of the magnetization reversal of the ferromagnetic elements are available from the exciting pole of the excitation magnet and its polarity at the same point of time Ts. This optimally simplified arrangement of a position detector makes it also possible to simultaneously obtain the energy for the evaluation electronics comprising a counter device, from the output signals of the sensor coil.

In spite of the basically possible and conceivable, simple mechanical structure of such detectors, the experience has shown that future applications require an extreme miniaturization of its structural elements and, thereby, of the system with a simultaneous, drastic cost reduction without, therein, giving away the advantages of the arrangement having a long life and being independent from external energy.

The advantageous further development of such multi turn sensors as high resolution linear segment or rotation counters in a one-chip-solution is, therefore, the objective of the invention.

In this connection, the consideration of the presently used technologies is important.

There exist multi turns out of:
1. optical single turns with optical/mechanical gear means,
2. optical single turns with magnetic/mechanical gear means,
3. magnetic single turns with optical/mechanical gear means,
4. magnetic single turns with magnetic/mechanical gear means.

Furthermore, capacitive single turns in combination with the corresponding gear means solutions are known.

Although gear means do not guarantee an absolute rotational speed detection because only a strictly delimited number of rotations can be detected and they only survive strictly delimited speeds and accelerations because of the possible size and the expectable costs, they should anyway be referred to in a comparative evaluation in order to clarify the idea of the invention.

Battery-operated multi turns are not absolute multi turns because they have an external electrical energy source which, furthermore, is technically not secure in multiple respects.

The absolute multi turn device disclosed in the present patent application, is not limited by the application technology but by physics.

Here, several $10^5$ rpm are possible. The number of the revolutions which can be detected and stored, is practically unlimited. Magnetic single turns nowadays achieve the same resolution as optical ones.

In spite of pronounced, technical advantages, a new technology finds it difficult to conquer a split-up market. This can only be achieved from the basis of costs. A one-chip-solution—as a final aim—for an absolute multi turn can be established in the marketplace.

However, already the technically and economically advantageous intermediate solutions brake up the market. It has to be emphasized here that such a one-chip-solution is realizable only in a simple and low cost way if the elements to be integrated have the same basis—preferably a magnetic one. In connection with the above-mentioned modifications such a one-chip-solution is only realizable—if at all—only with difficulties out of mechanical or energy reasons.

The successive integration of the single elements which are there partly already as ICs, and partly still directly, through advantageous intermediate solutions to the final aim of a one-chip-solution while observing important round conditions, as they are stated in the sub-claims, is the basis and the objective of the invention.

The optimal realization through intermediate solutions to the final chip as magnetic multi turn is therefore, disclosed in the examples and the drawings.

The absolute high resolution segment or revolution counter comprises one single ferromagnetic element having at least one coil surrounding this element as Wiegand element, at least one additional sensor element for detecting information for counting the segments or revolutions in both directions, an additional magnetic sensor for the fine resolution of the segments or of a revolution, at least one common excitation magnet for the segment-/revolution counter and the additional sensor, a control logic and power controller for the segment-/rotation counter, a logic for the multi turn application or µ-controller for the fine resolution, respectively, and a non-volatile counter and memory unit for the permanent storage of the count information.

Because of an inventive arrangement of the Wiegand element directly in the main magnetic field between two excitation magnets, the magnetic back connection of which is formed by a common ferromagnetic back connection body, preferably formed as a closed ring, a revolution counter is provided which is formed symmetrical with respect to geometry and magnetic property, which rotation counter achieves smallest dimensions and, thereby, enables also the detection of highest rotational speeds because it is largely shielded against external influences.

An energy storage is only necessary in such a case where the reaction time of the additional sensor element is larger than the duration of the voltage pulse from the coil through the ferromagnetic element. This is, for example, the case with present Hall sensors, not, however, in the usage of field plates.

Preferably, the energy storage device is formed as a capacitor. The ferromagnetic element is, in today's view, economically always a pulse or Wiegand wire.

In an advantageous way, by means of the coil, the polarity of the excitation magnet is adapted to be detected as well as the energy supply for the counter and memory unit, the additional sensor element and the control unit with a power control is ensured.

In order to determine the state of the ferromagnetic element, the coil is, in an advantageous way, supplied with a ramp shaped current advantageously upon switching of the external voltage for synchronization with the additional sensor.

Preferably, the additional sensor element and/or the additional sensor is/are formed as a field plate and/or Hall sensor.

In an advantageous way, the additional sensor takes up the task of the additional sensor element, i.e. the detection of the position of the excitation magnet.

Preferably, the additional sensor comprises an internal and an external voltage supply.

Preferably, the additional sensor carries out a coarse resolution over at least one half of a segment or one half of a revolution upon occurrence of an internal voltage, i.e. in a low current operation, and, therein, detects the polarity of the excitation magnet.

Preferably, the additional sensor is operated by a clock in case of an externally applied voltage. Thereby, it is guaranteed that the current consumption is under the critical limit of 4 mA such that the high revolution segment or rotation counter, respectively, is also applicable in self secure systems.

For the purpose of a highly accurate resolution, the analog signals of the additional sensor are, in an advantageous way, corrected in a µ-controller or the logic for the fine resolution, respectively, by means of the Fourier analysis.

Preferably, the ferromagnetic element with the surrounding coil and the additional sensor is located in the magnetic field between the two magnets which have a common magnetic back connection through a ferromagnetic ring or a sensor cover.

The at least two excitation magnets are, therein, preferably hard magnetic material bound by plastics.

Preferably, the non-volatile memory is formed as a ferromagnetic random access memory (FRAM) which is adapted to be supplied from the induction coil with an internal voltage and, at least in part of the time, with an external voltage for reading out the count information.

Preferably, the capacitor is formed in FRAM-technology. Preferably, the absolute multi turn is formed as an absolute magnetic multi turn. A multi turn is named magnetic multi turn, the active elements of which—Wiegand element, additional sensor element, additional sensor—react to magnetic fields and the rest of the device elements to electrical signals or energy, respectively. According to an embodiment, in a first integration step, the additional sensor element, the control logic and power controller IC and the additional sensor are combined into an overall IC as a target IC1.

According to a further embodiment, the counter unit with the non-volatile memory and, if applicable, with a storage capacitor are combined with the target IC1 to a target IC2 on IC level.

In a further embodiment, the target IC2 is integrated with the µ-controller at IC level to a target IC3.

In a final embodiment, the end IC as a one-chip-solution, also the ferromagnetic element and the coil are integrated. The target ICs can also be formed as several ICs in only one housing.

It is a matter of course that the combination of the ICs and the components in the various integration stages and the sequences thereof to a one-chip-solution may be arbitrary. The integration stages proposed here and the sequence of steps thereof show only the optimal solution at a time as an embodiment.

The invention is described in the following with reference to embodiments illustrated more or less schematically in the drawing.

Figure 1:
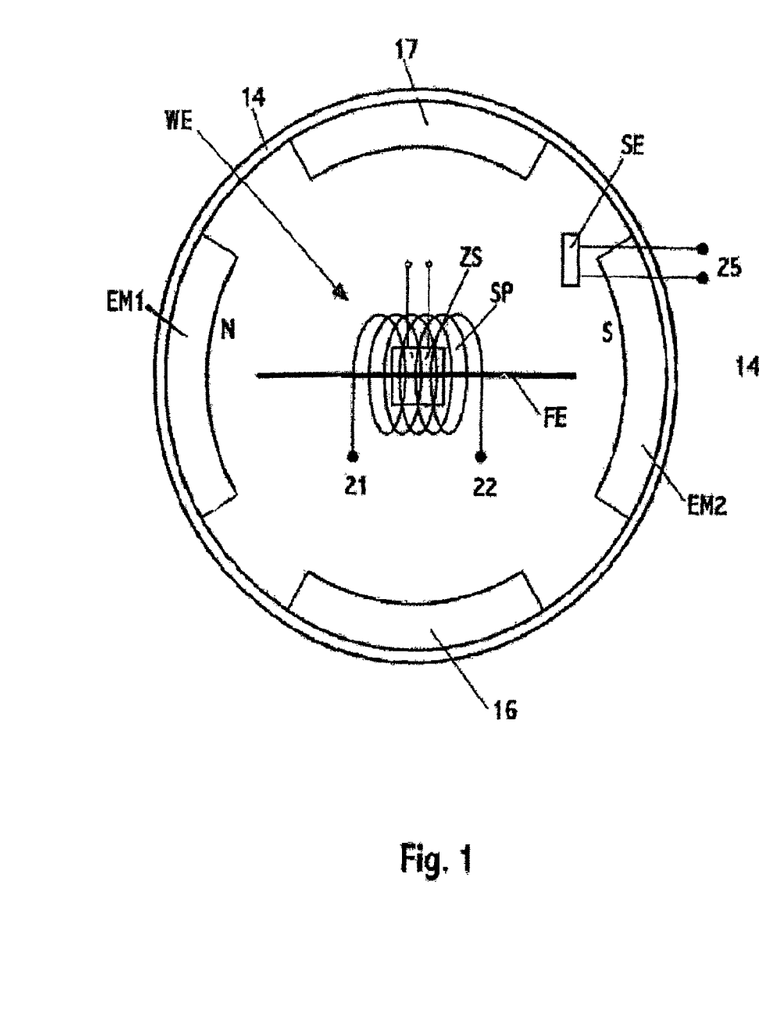
FIG. 1 shows a schematic arrangement of an embodiment of an inventive absolute magnetic high resolution segment or rotation counter having a ring shaped back connection body prior to the first integration stage in top view.
Figure 2:
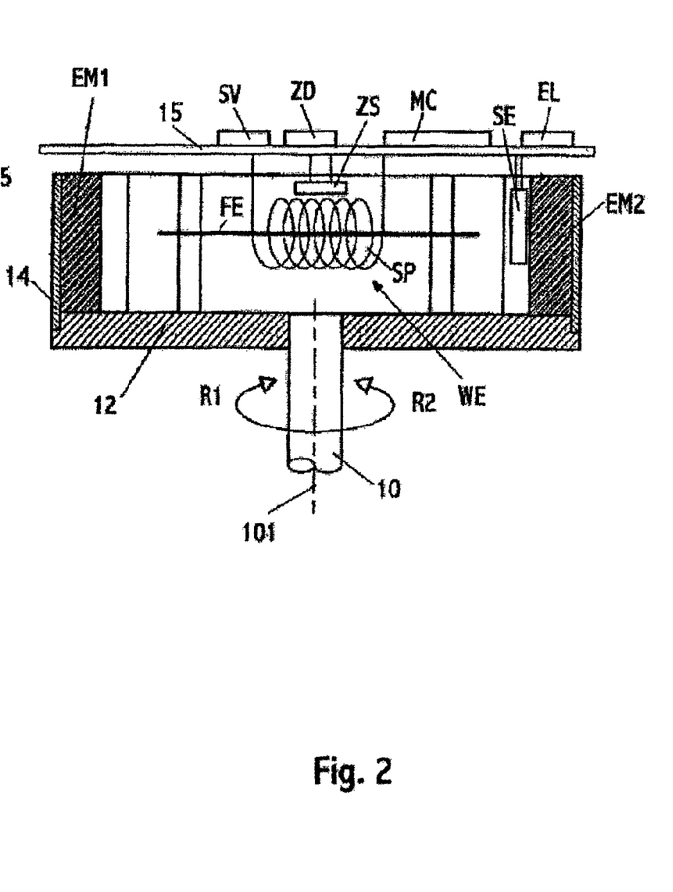
FIG. 2 shows the segment or rotation counter according to FIG. 1 in section.

In the example shown in FIGS. 1 and 2 of an embodiment prior to the first integration stage of an absolute magnet high resolution rotation counter, the moving body is a shaft 10 which is adapted to rotate in the direction of the arrows R1 and R2, i.e. in clockwise or counterclockwise direction. In order to be able to count the revolutions of the shaft 10, it is connected to a magnet carrier 12 associated with two oppositely arranged excitation magnets EM1 and EM2 being formed in the shape of a circular section and comprising a north pole N and a south pole S. The excitation magnets are surrounded by a ring formed as a ferromagnetic back connection body 14, the radius of the ring corresponding to the radius of the excitation magnets formed in the shape of a circular section. In between the opposite output surfaces of the excitation magnets, there is positioned a Wiegand element WE consisting out of a ferromagnetic element FE which is surrounded by a sensor coil SP. The Wiegand element WE is supported by a circuit board 15 in between the output surfaces of the excitation magnets EM1 and EM2 such that its ferromagnetic element FE is facing these output surfaces and, therefore, maybe axially traversed by the excitation magnet field.

For the purpose of determining the polarity of the excitation magnets upon passage of the ferromagnetic element FE, as an additional sensor element SE a Hall sensor is provided which is also supported by the circuit board 15 and at the output 25 of which a positive, negative or a zero signal may be taken out depending on the polarity N or S of the excitation magnets and the positions thereof.

Additionally, an additional sensor ZS providing the fine resolution of one revolution, is provided. The additional sensor is arranged also in the main field between the two excitation magnet EM1 and EM2 such that it is also electromagnetically shielded. For this purpose, it "sees" a nearly homogenous magnetic field which greatly reduces disturbances caused by magnetic excitation. The measurement signal, thereby, enables highest accuracy and resolution. Wiegand element and additional sensor ZS look at the common back connection body 14, i.e. the reaction effects of the Wiegand element to the additional sensor are drastically reduced in this way. Since the latter one also is located in the main field between the two excitation magnets, it is also electromagnetically shielded. The additional sensor element SE is arranged in the stray field.

Such a rotation counter comprises, for example, a diameter of 10-15 mm and can be operated at more than $10^5$ rpm.

Figure 3:
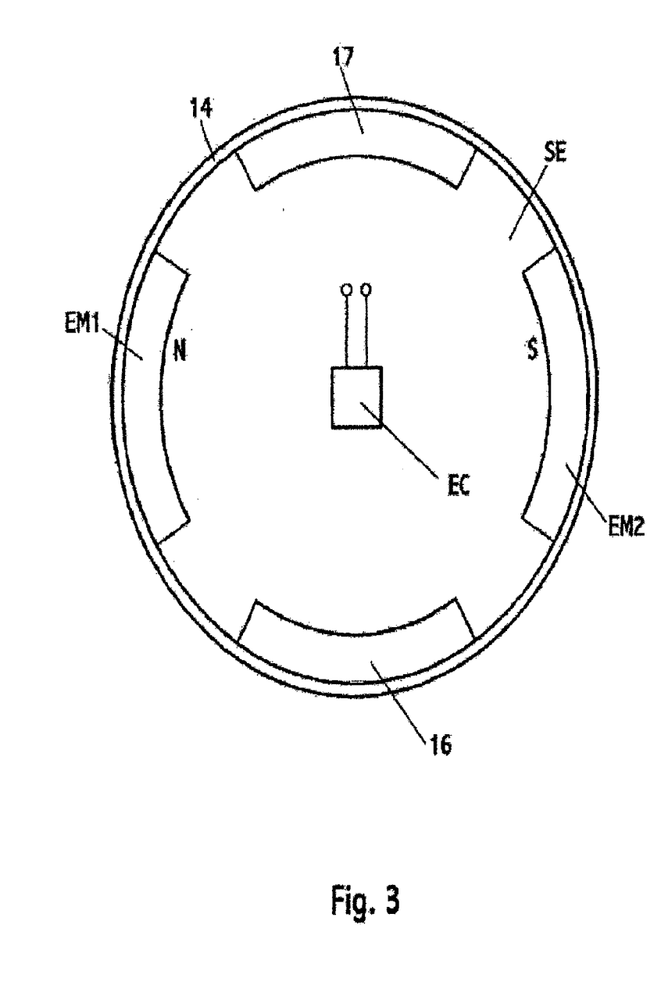
FIG. 3 shows a schematic arrangement of an embodiment of the inventive absolute magnetic high resolution segment or revolution counter with ring shaped back connection body of the last integration stage in top view.
Figure 4:
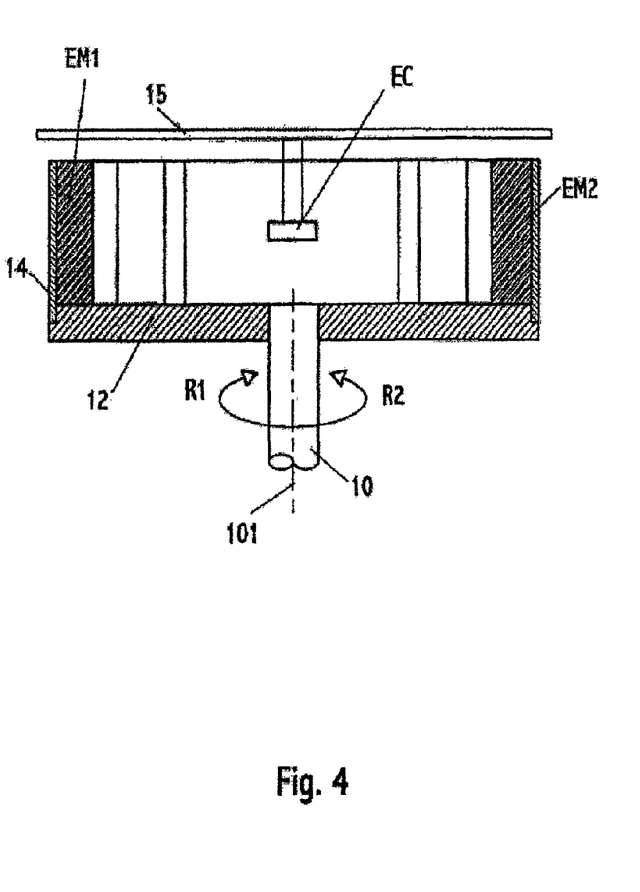
FIG. 4 shows the segment or revolution counter according to FIG. 3 in section.

In the FIGS. 3 and 4, the absolute magnetic multi turn described with reference to FIGS. 1 and 2, is shown in the last integration stage. Here, the end IC is positioned centrally in the rotational axis of the ferromagnetic back connection body 14 in the magnetic field between the two excitation magnets EM1 and EM2.

Figure 5:
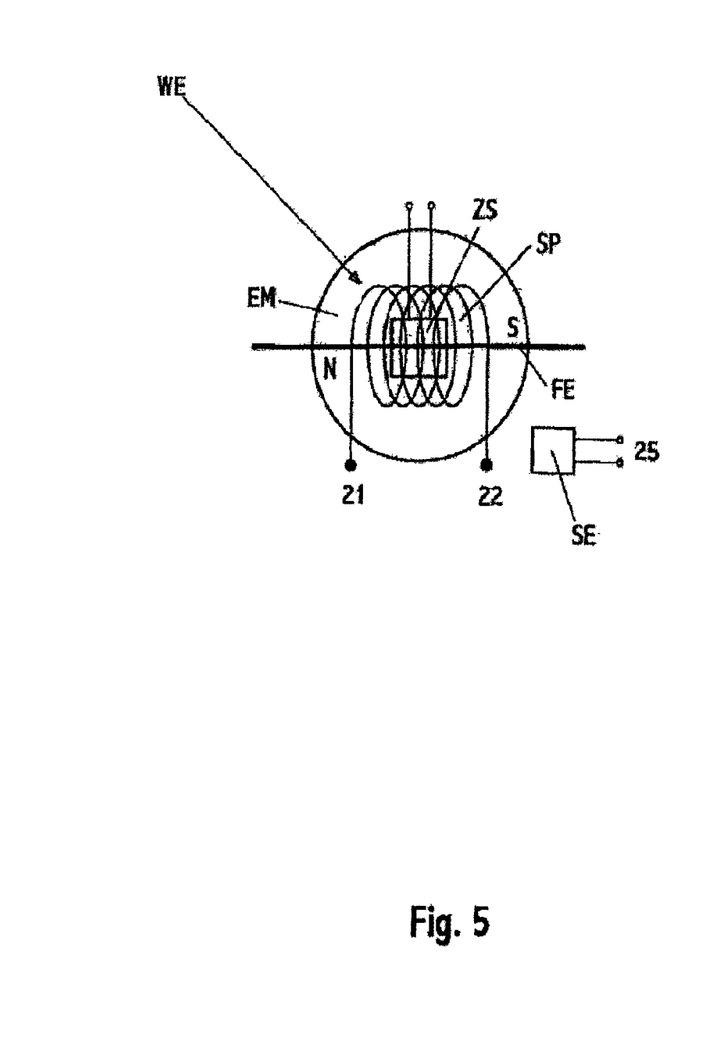
FIG. 5 shows a schematic arrangement of an embodiment of the inventive absolute magnetic high resolution segment or revolution counter in an open implementation prior to the first integration stage.
Figure 6:
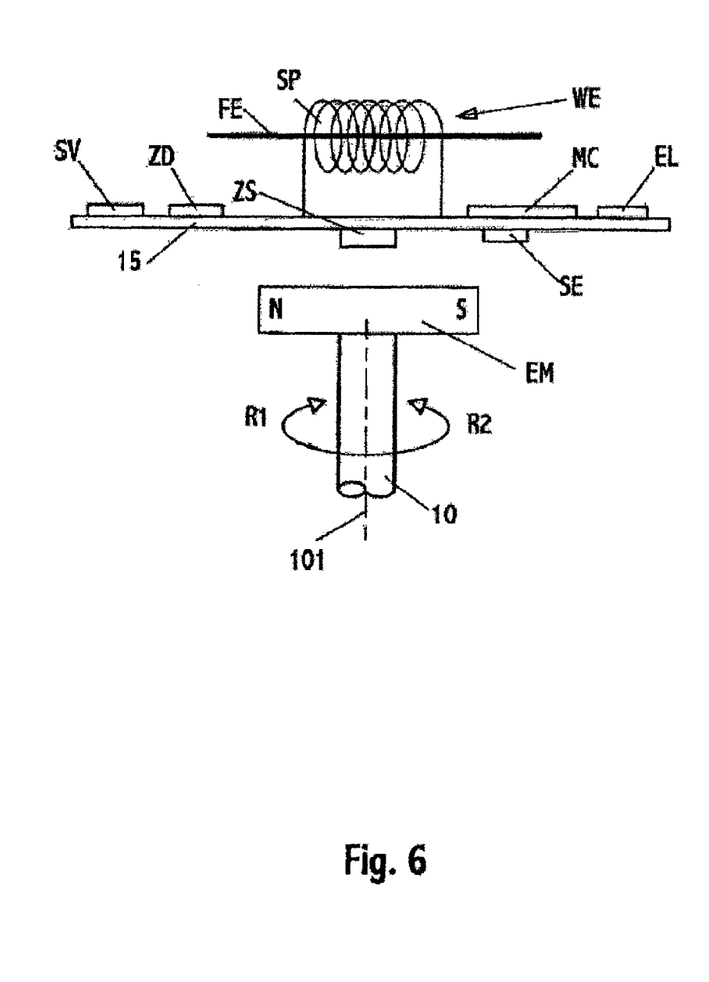
FIG. 6 shows a schematic arrangement of an embodiment according to FIG. 5 in section.

The embodiments shown in FIGS. 5 and 6 of an inventive absolute magnetic multi turn prior to the first integration stage is, in so far, an open arrangement because the magnetic back connection body 14 is missing in the ferromagnetic element FE, the additional sensor element SE and the additional sensor ZS are located in the stray field of only one common excitation magnet which is positioned as a diametrically magnetized circular magnet directly on the drive shaft 10.

One would select such an embodiment always in such cases where enough space is available for the multi turn sensor and the given rotational speeds are low. A ferromagnetic cover out of soft iron having a large diameter takes over the shielding against external influences.

Figure 7:
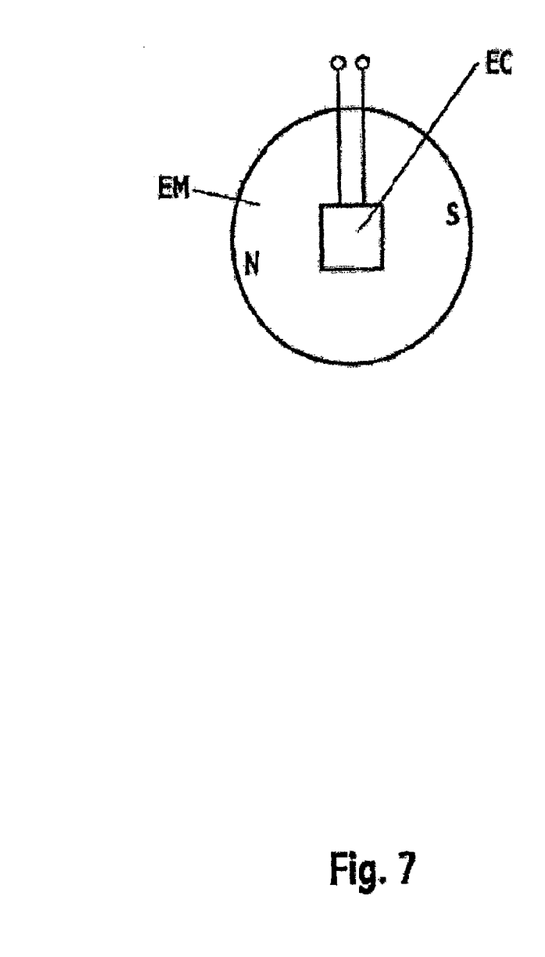
FIG. 7 shows a schematic arrangement of an embodiment according to FIG. 5 after the last integration stage.
Figure 8:
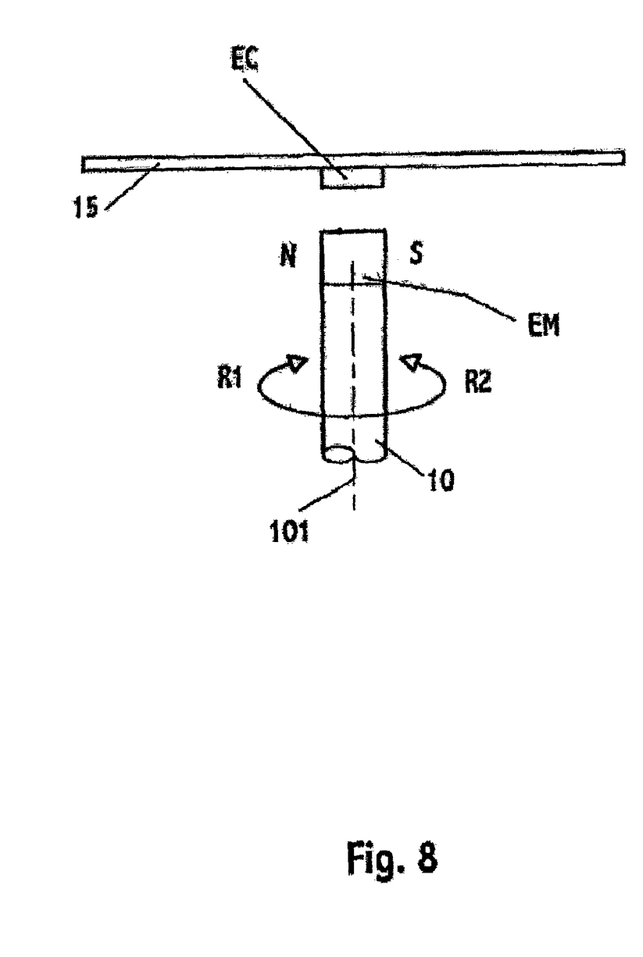
FIG. 8 shows a schematic arrangement of an embodiment according to FIG. 7 in section.

The FIGS. 7 and 8 show the multi turn described with reference to the FIGS. 5 an 6 after the last integration stage.

Figure 9:
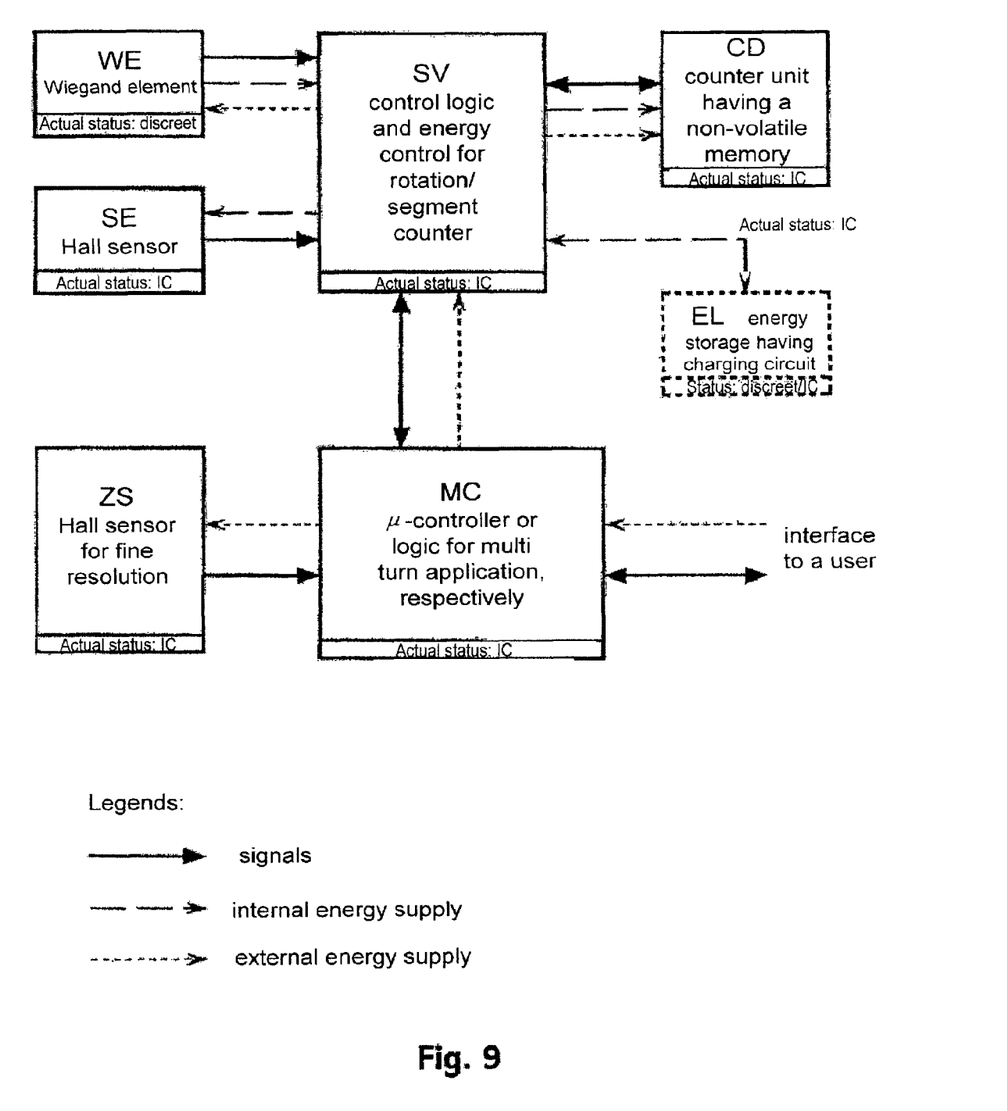
FIG. 9 shows a block diagram of the complete electronics with ferromagnetic element and coil of the absolute magnetic multi turn from FIGS. 1 to 8 prior to the first integration stage.

FIG. 9 shows the present multi turn described with reference to FIGS. 1 to 8, in form of a block diagram in the starting stage, i.e. prior to the first integration stage. The complete electronics with the ferromagnetic element and the coil is disclosed. Wiegand element and capacitor are provided in a discrete embodiment, the rest of the elements as ICs.

In FIG. 9 as well as also in the following block diagrams, the dotted lines/arrows symbolize the progress of external energy, the broken lines/arrows the internal energy and the full lines/arrows that of the signals.

Figure 10:
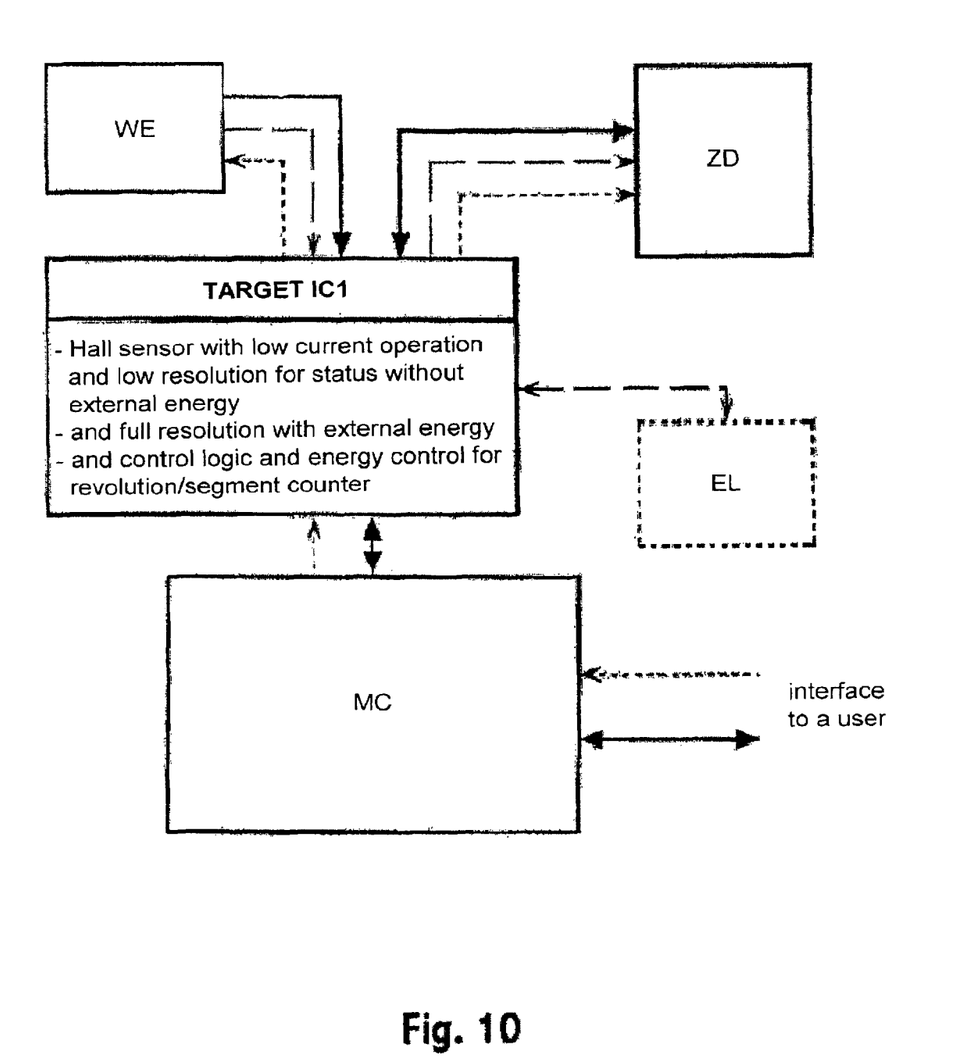
FIG. 10 shows a block diagram of the complete electronics with ferromagnetic element and coil of the absolute magnetic multi turn with the target IC1 after the first integration stage.

For reducing the construction size and the costs, the embodiment provided according to FIG. 10 as block diagram, is envisioned. Additional sensor, additional sensor element and electronics for controlling and power control are combined to a target IC1 in a first integration step. It contains a Hall sensor operating with a low resolution at low current self sustained operation and which serving for detecting the poles of the excitation magnet(s). It achieves the full resolution upon supply of external energy wherein it is, in an advantages way, clocked out of energy reasons.

Figure 11:
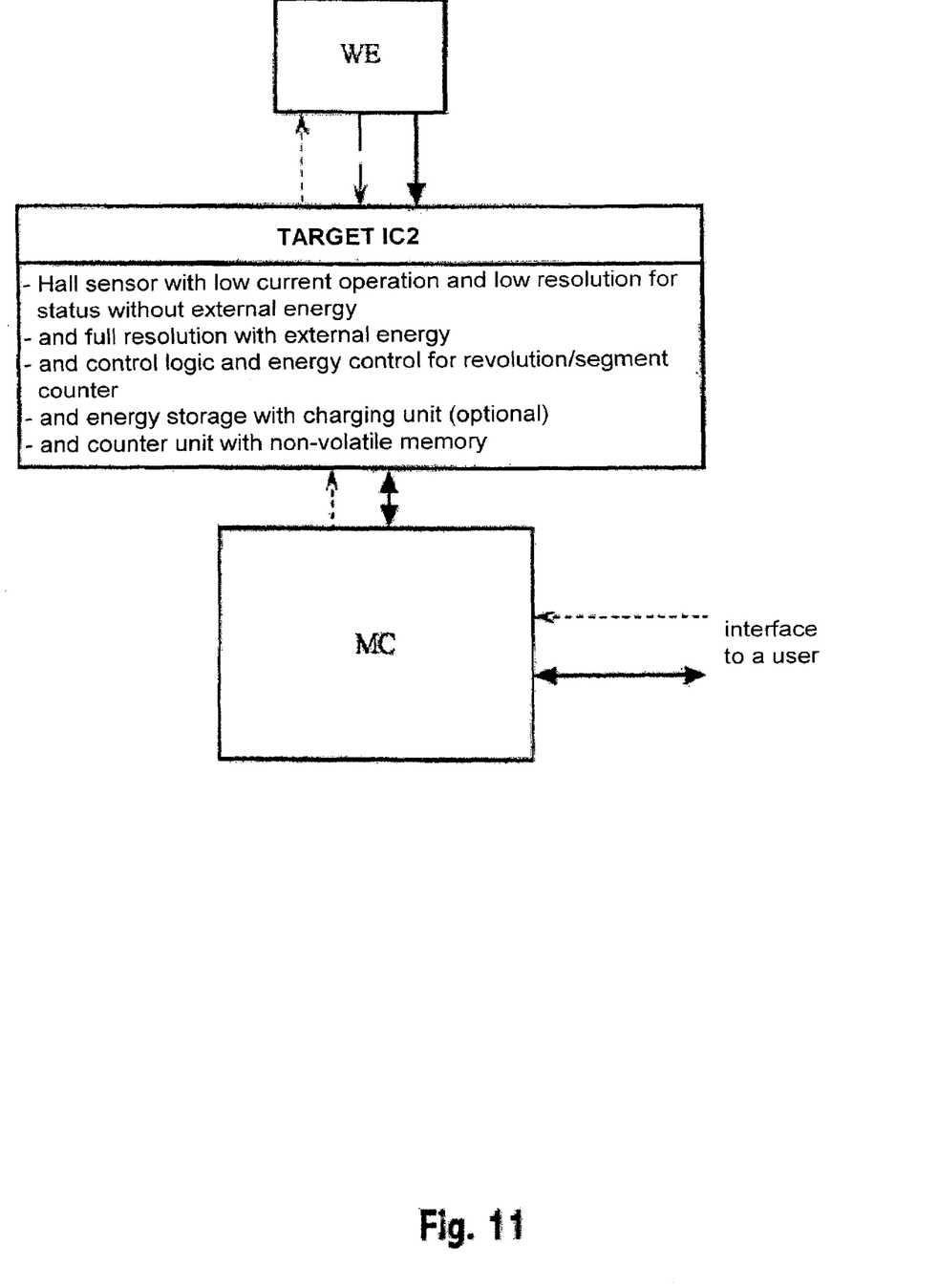
FIG. 11 shows a block diagram of the complete electronics with ferromagnetic element and coil of the absolute magnetic multi turn with the target IC2 after the second integration stage.

A further step in the direction as described above is referenced to FIG. 10, is shown with the second integration step in FIG. 11. According to this embodiment, also the counter unit with the non-volatile memory and the at least one capacitor, if provided, are combined into the target IC1 to a target IC2 on IC level. This step makes sense because a new technology to be integrated, the FRAMs, comes up here. Since capacitors in the nF range are required, only one IC capacitor is cost effective in FRAM technology.

Figure 12:
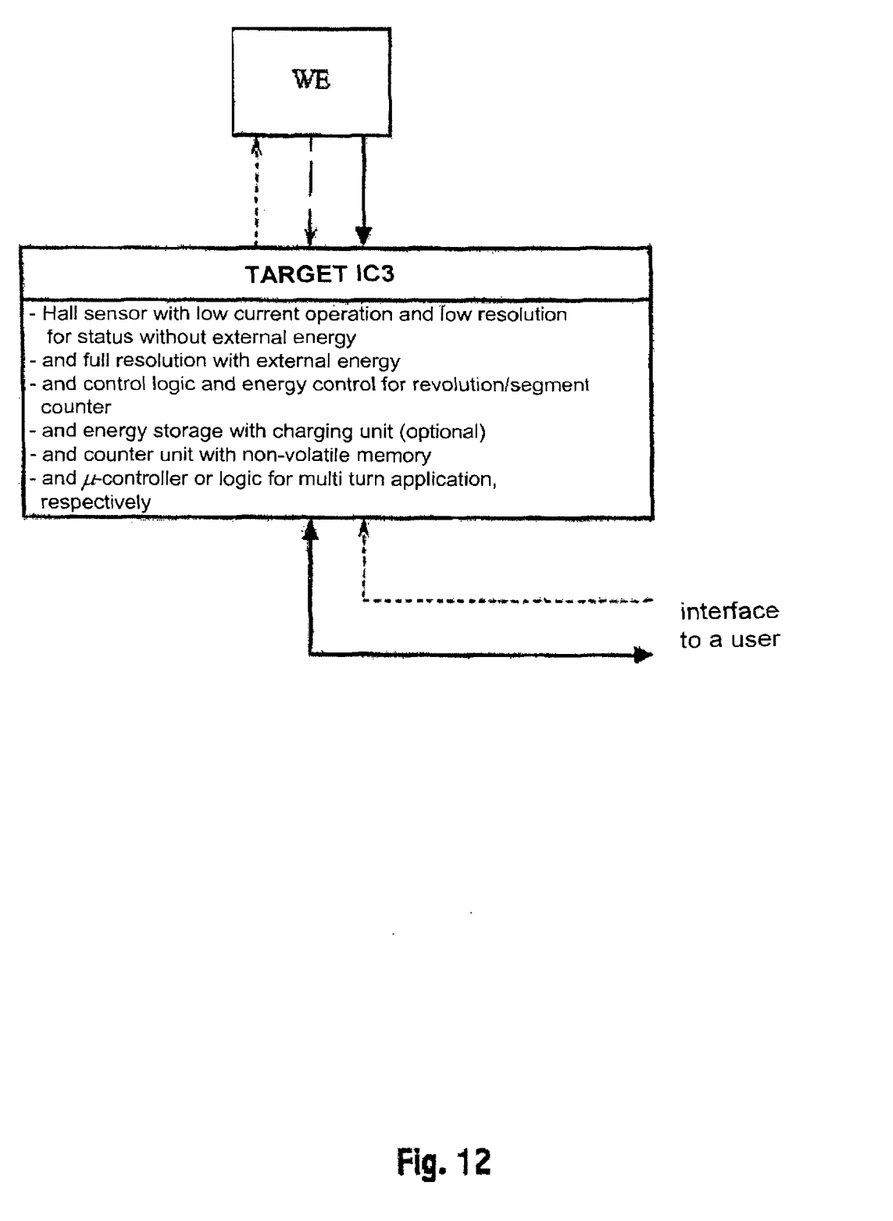
FIG. 12 shows a block diagram of the complete electronics with ferromagnetic element and coil of the absolute magnetic multi turn with the target IC3 after the third integration stage.

In the embodiment according to FIG. 12, the target IC2 is combined, for example, with a µ-controller to a target IC3. By means of this third integration step, it is not only achieved that the electronics important for the function, is combined cost effectively, but also an improvement of the function and the shielding is obtained. At the same time, the limit of what can easily be made today, is reached.

Figure 13:
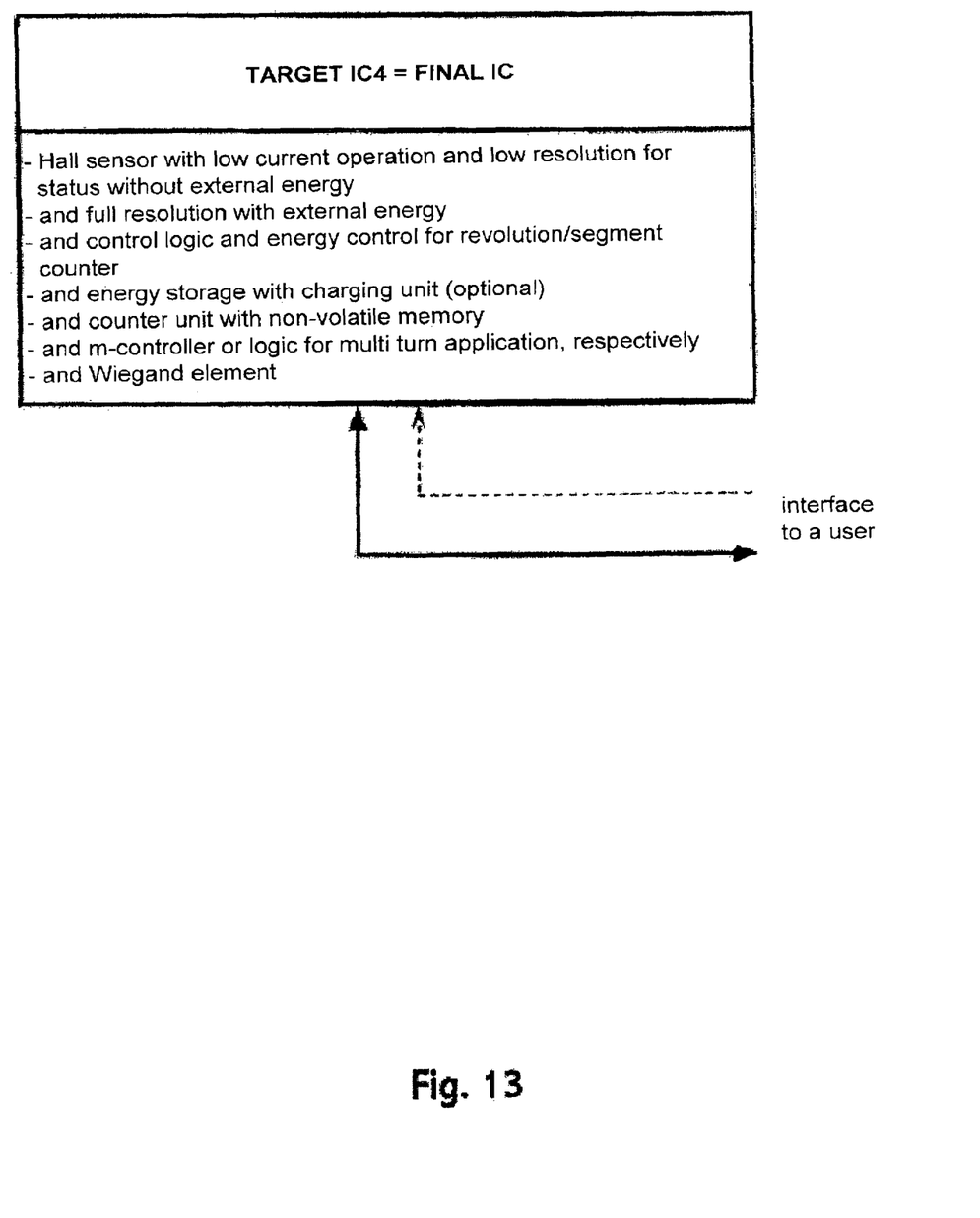
FIG. 13 shows a block diagram of the absolute magnetic multi turn the complete electronics including the ferromagnetic element and the coil are combined into an IC in the last integration stage.

By means of the last integration step as shown in the block diagram according to FIG. 13, a one-chip-solution for the absolute multi turn is provided as final target. This desired step which is possible from stand point of physics, depends essentially from which point of time on FRAM memories with a lower limit of voltage for the shielding, which should be below 2 V, are available on the market. Therefore, the number of coil windings is reduced such that a chip coil is cost effective.

LIST OF REFERENCE SIGNS 10 shaft
12 magnet carrier
14 back connection body
15 circuit board 21 output-connection of coil
22 output-connection of coil
25 output-connection of Hall sensor
EM1 excitation magnet
EM2 excitation magnet
WE Wiegand element
FE ferromagnetic element
SP Wiegand coil
SE additional sensor element
SV control logic and power control
ZD counter unit with non-volatile data memory
ZS additional sensor
MC μ-controller or logic for multi turn arrangement, respectively
EL energy storage with loading circuitry
EC one-chip-solution=end IC
N north pole
S south pole
R1 arrow
R2 arrow

The invention claimed is:

1. An absolute high resolution segment or revolution counter, comprising:
   a shaft;
   at least one moving excitation magnet affixed to said shaft;
   a Wiegand element, said Wiegand element includes a ferromagnetic element;
   a rotation counter; said rotation counter having a non-volatile data memory;
   a first sensor, said first sensor includes an induction coil wound around said ferromagnetic element, said induction coil provides a first output, said first output provides an output current;
   a second sensor, said second sensor provides a second output;
   a third sensor for fine resolution of a revolution, said third sensor provides a third output;
   a control logic device for processing said first output from said first sensor and said second output from said second sensor;
   an energy storage circuit;
   a power controller in electrical communication with said first output of said first sensor, said second sensor, said rotation counter, and said energy storage circuit;
   said power controller operating without external electrical energy, said energy storage circuit receiving energy from said first sensor;
   a μ-controller for analyzing fine resolution information from said third output of said third sensor, said μ-controller in electrical communication with said control logic device and said power controller;
   at least one of said: Wiegand element, said first sensor, said second sensor, said third sensor, said control logic device, said energy storage circuit, said power controller, said rotation counter having a non-volatile data memory, said third sensor for fine resolution of a revolution, and, said μ-controller, is integrated into an integrated circuit in a chip/semiconductor substrate; and,
   said rotation counter determines the number of revolutions and position of said shaft.

2. The absolute high resolution segment or revolution counter according to claim 1, wherein said second sensor, said control logic device, said power controller and said third sensor are integrated into said chip/semiconductor substrate.

3. The absolute high resolution segment or revolution counter according to claim 1, wherein said energy storage device includes a circuit associated with said rotation counter, said energy storage device comprises at least one capacitor.

4. The absolute high resolution segment or revolution counter according to claim 1, wherein said integrated circuit includes said energy storage device, said energy storage device includes a charging circuit, said integrated circuit includes said rotation counter with said non-volatile data memory.

5. The absolute high resolution segment or revolution counter according to claim 1, wherein said integrated circuit includes said μ-controller.

6. The absolute high resolution segment or revolution counter according to claim 5, wherein said integrated circuit includes said Wiegand element.

7. The absolute high resolution segment or revolution counter according to claim 1, wherein said ferromagnetic element is a pulse or Wiegand wire.

8. The absolute high resolution segment or revolution counter according to claim 1, wherein said second sensor is a Hall sensor, a field plate or a capacitive sensor.

9. The absolute high resolution segment or revolution counter according to claim 1, wherein said third sensor is a field plate and/or Hall sensor.

10. The absolute high resolution segment or revolution counter according to claim 1, wherein said third sensor is formed as a capacitive sensor.

11. The absolute high resolution segment or revolution counter according to claim 1, wherein said coil is supplied with a ramp shaped current upon switching on an external voltage for synchronizing with said second sensor, in order to determine the status of said ferromagnetic element.

12. The absolute high resolution segment or revolution according to claim 1, wherein said second sensor determines the position of said excitation magnet.

13. The absolute high resolution segment or revolution counter according to claim 1, wherein said second sensor has an internal and, additionally, an external voltage supply through said coil.

14. The absolute high resolution segment or revolution counter according to claim 1, wherein said second sensor executes a course resolution over at least one half of a segment or one half of a revolution upon occurrence of an internal voltage in low current operation, and, therein, determines the polarity of said excitation magnet.

15. The absolute high resolution segment or revolution counter according to claim 1, wherein said third sensor is clocked with an externally supplied voltage.

16. The absolute high resolution segment or revolution counter according to claim 1, wherein said non-volatile data memory is formed as a Ferroelectric Random Access Memory (FRAM) which is adapted to be supplied from said induction coil with an internal voltage and at least, from time to time, with an external voltage for reading out the count information.

17. The absolute high resolution segment or revolution counter according to claim 1, further comprising complete information for evaluating the polarity and the movement direction of at least one excitation magnet for counting, consists of data in said non-volatile data memory and consists of data from said output of said induction coil as well as from said output of said second sensor.

18. An absolute high resolution segment or revolution counter, comprising:
   a shaft;
   at least one moving excitation magnet affixed to said shaft;
   a Wiegand element, said Wiegand element includes a ferromagnetic element;

a rotation counter; said rotation counter having a non-volatile data memory;

a first sensor, said first sensor includes an induction coil wound around said ferromagnetic element, said induction coil provides a first output, said first output provides an output current;

a second sensor, said second sensor provides a second output;

a third sensor for fine resolution of a revolution, said third sensor provides a third output;

a control logic device for processing said first output from said first sensor and said second output from said second sensor;

an energy storage circuit;

a power controller in electrical communication with said first output of said first sensor, said second sensor, said rotation counter, and said energy storage circuit;

said power controller operating without external electrical energy, said energy storage circuit receiving energy from said first sensor;

a logic circuit for analyzing fine resolution information from said third output of said third sensor, said logic circuit in electrical communication with said control logic device, and said power controller;

at least one of said: Wiegand element, said first sensor, said second sensor, said third sensor, said control logic device, said energy storage circuit, said power controller, counter, said rotation counter unit having a non-volatile data memory, said third sensor for fine resolution of a revolution, and, said logic circuit, is integrated into an integrated circuit in a chip/semiconductor substrate; and, said rotation counter determines the number of revolutions and position of said shaft.

\* \* \* \* \*

UNITED STATES PATENT AND TRADEMARK OFFICE
CERTIFICATE OF CORRECTION

| | |
|---|---|
| PATENT NO. | : 9,200,925 B2 |
| APPLICATION NO. | : 14/073096 |
| DATED | : December 1, 2015 |
| INVENTOR(S) | : Mehnert et al. |

Page 1 of 1

It is certified that error appears in the above-identified patent and that said Letters Patent is hereby corrected as shown below:

In the specification,

Col. 1, line 3, after the title, insert -- This application is a continuation of United States patent application serial no. 12/672,897 (PCT/DE2008/001306 filed August 7, 2008), 371 (c) filing date May 24, 2010 and applicants claim the benefit and priority thereof. Applicant claims priority to German Patent Application No.: DE 10 2007 039 051.5 filed August 17, 2007 which is hereby incorporated by reference. --.

Col. 2, line 58, after "solutions," delete "brake up" and insert -- break up" -- therefor.

Col. 4, line 46, after the paragraph "The invention is described in the following with reference to embodiments illustrated more or less schematically in the drawing.", insert paragraph -- BRIEF DESCRIPTION OF THE DRAWINGS --.

Col. 5, line 14, after the paragraph "Figure 13 shows a block diagram of the absolute magnetic multi turn the complete electronics including the ferromagnetic element and the coil are combined into an IC in the last integration stage.", insert paragraph -- DESCRIPTION OF THE INVENTION --.

Col. 6, line 15, after "FIGS. 5" delete "an" and insert -- and -- therefor.

In the claims,

Col. 8, line 10, claim 5, after "according to claim" delete "1" and insert -- 4 -- therefor.

Signed and Sealed this
Third Day of May, 2016

Michelle K. Lee
*Director of the United States Patent and Trademark Office*